United States Patent
Lee et al.

(10) Patent No.: US 10,663,384 B2
(45) Date of Patent: May 26, 2020

(54) DROP TESTING APPARATUS

(71) Applicant: KOREA AEROSPACE RESEARCH INSTITUTE, Daejeon (KR)

(72) Inventors: Jung Jin Lee, Daejeon (KR); Joong Wook Kim, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 400 days.

(21) Appl. No.: 15/801,870

(22) Filed: Nov. 2, 2017

(65) Prior Publication Data
US 2018/0120208 A1     May 3, 2018

(30) Foreign Application Priority Data

Nov. 2, 2016    (KR) ........................ 10-2016-0145212

(51) Int. Cl.
*G01N 3/303*      (2006.01)
*G01M 7/08*      (2006.01)
*G01N 3/40*      (2006.01)

(52) U.S. Cl.
CPC .............. *G01N 3/303* (2013.01); *G01M 7/08* (2013.01); *G01N 3/40* (2013.01)

(58) Field of Classification Search
CPC .... G01M 7/08; G01M 17/0078; G01N 3/303; G01N 3/40; G01N 3/30; G01N 2203/0033; G01N 3/307; G01N 2203/0039; G01N 33/46; G01N 3/48
USPC .......... 73/12.01, 12.04, 12.06, 12.07, 12.09, 73/12.12, 12.13, 12.14
See application file for complete search history.

(56) References Cited

FOREIGN PATENT DOCUMENTS

| KR | 10-0501349 B1 | | 9/2005 |
|----|---------------|---|--------|
| KR | 100501349 | * | 9/2005 |
| KR | 10-2007-0079355 A | | 8/2007 |
| KR | 10-2009-0028661 A | | 3/2009 |
| KR | 10-2011-0026864 A | | 3/2011 |
| KR | 10-2014-0000398 A | | 1/2014 |

OTHER PUBLICATIONS

Korean Office Action dated Aug. 16, 2017, in corresponding Korean Patent Application No. 10-2016-0145212. (5 pages).

* cited by examiner

*Primary Examiner* — John Fitzgerald
*Assistant Examiner* — Truong D Phan
(74) *Attorney, Agent, or Firm* — Buchanan Ingersoll & Rooney PC

(57) ABSTRACT

A drop testing apparatus is provided. The drop testing apparatus includes a plate connected to an external crane, a magnet holder provided at one end of the plate and fixed to the plate by an electromagnetic force, a counterweight provided at another end of the plate and facing the magnet holder, a dummy structure connected to the magnet holder through a connecting member and having a test specimen installed at one side thereof, a load cell unit provided between the dummy structure and the test specimen to measure impulse of the test specimen, and a controller configured to control the electromagnetic force to be created in the magnet holder and to receive the impulse measured by the load cell unit. When the electromagnetic force is cancelled, the connecting member disengages from the magnet holder, and the dummy structure and the test specimen fall onto the ground.

11 Claims, 9 Drawing Sheets

DROP TESTING APPARATUS

CROSS-REFERENCE TO RELATED APPLICATION

This application claims the benefit of Korean Patent Application No. 10-2016-0145212, filed on Nov. 2, 2016, in the Korean Intellectual Property Office, the disclosure of which is incorporated herein in its entirety by reference.

BACKGROUND

1. Field

One or more embodiments relate to a drop testing apparatus, and more particularly, to a drop testing apparatus for providing a drop testing environment for communication/electronic products, aircraft components, and other mechanical components.

2. Description of the Related Art

Drop testing apparatuses are usually used in the particular space in which they have been installed and are difficult to move to work sites or places where users want to use the apparatuses. In addition, due to limitations in size and weight, drop testing apparatuses are unsuitable for testing a whole system or component.

Drop testing apparatuses usually include a function of measuring vertical displacement, load, acceleration, velocity, and strain, and processing data. However, when a small-sized drop testing apparatus is used, a small-sized component itself or a specified weight is dropped from a certain height using an electromagnet and impact load characteristics of the component or system are simply detected, and therefore, it is hard to obtain diverse information.

Large-sized drop testing apparatuses are expensive and suitable for detecting the crashworthiness of a landing gear or fuselage but are unsuitable for testing at an airframe level due to a limitation in size. In addition, since a drop testing jig and a structure realizing a boundary condition are required with respect to certain components, using large-sized drop testing apparatuses is costly and time-consuming.

This description of the related art is technical information which was known by the inventors for deduction of the inventive concept or acquired during the deduction, and should not be considered as having necessarily been published before the pertinent application.

SUMMARY

One or more embodiments include a movable drop testing apparatus for increasing the reliability of measurement results and a drop testing method using the drop testing apparatus.

Additional aspects will be set forth in part in the description which follows and, in part, will be apparent from the description, or may be learned by practice of the presented embodiments.

According to one or more embodiments, a drop testing apparatus includes a plate connected to an external crane; a magnet holder provided at one end of the plate and fixed to the plate by an electromagnetic force; a hook extending from one side of the magnet holder and inserted into an opening of the plate; a counterweight provided at another end of the plate and facing the magnet holder; a dummy structure connected to the magnet holder through a connecting member connected to the hook, the dummy structure having a test specimen installed at one side thereof; a load cell unit provided between the dummy structure and the test specimen to measure impulse of the test specimen; and a controller configured to control the electromagnetic force to be created in the magnet holder and to receive the impulse measured by the load cell unit. When the electromagnetic force is cancelled in the magnet holder, the magnet holder and the hook may rotate around a rotation shaft of the plate such that the connecting member disengages from the hook and such that the dummy structure and the test specimen fall onto a ground.

The drop testing apparatus may further include a distance measuring sensor provided at the one side of the dummy structure and facing the ground, wherein the distance measuring sensor measures a distance between the test specimen and the ground, and a strain measuring sensor provided at one side of the test specimen to measure a strain variation in the test specimen.

The drop testing apparatus may further include a position measuring sensor provided close to a center of mass of the dummy structure to measure a position variation in the test specimen.

The connecting member may extend in a falling direction to allow the test specimen to be separated from the magnet holder by a predetermined distance.

The drop testing apparatus may further include an elastic member between the hook and the plate.

The load cell unit may include a first frame connected to the dummy structure, a second frame connected to the test specimen, a plurality of load cells provided between the first frame and the second frame, and a guiding unit provided between two adjacent load cells from among the plurality of load cells to guide movement of the second frame against the first frame.

The drop testing apparatus may further include a position setting unit extending obliquely from a side edge of the plate toward the ground to fix the plate to a predetermined position.

The controller may calculate a center of gravity of the dummy structure onto which the test specimen is installed and calculate a moment of inertia using a period of oscillation of the dummy structure.

The drop testing apparatus may further include a tilt setting unit provided at an end of the dummy structure to set a tilt of the dummy structure with respect to the ground.

According to one or more embodiments, a drop testing apparatus includes a magnet unit installed at one side of an external crane, the magnet unit including a magnet holder and a hook, wherein the magnet holder is configured to be fixed to a plate when an electromagnetic force is created and to rotate with respect to the plate when the electromagnetic force is cancelled, and the hook is configured to be inserted through an opening of the plate; a dummy structure having one side connected to the hook and another side at which a test specimen facing the ground is installed; and a load cell unit provided between the dummy structure and the test specimen, the load cell unit including a load cell and a guiding unit provided adjacent to the load cell and extending in a falling direction of the test specimen. When the electromagnetic force is created in the magnet unit, the dummy structure may be connected to the magnet unit. When the electromagnetic force is cancelled, the magnet holder and the hook may rotate around a rotation shaft of the plate, and the dummy structure may disengage from the hook and fall onto the ground.

The drop testing apparatus may further include a first sensor and a second sensor, wherein the first sensor is provided at the one side of the dummy structure to measure a position variation of the dummy structure or a distance between the dummy structure and the ground, and the second sensor is provided at one side of the test specimen to measure a strain variation of the test specimen.

According to one or more embodiments, a drop testing method for a test specimen includes installing a load cell unit between the test specimen and a dummy structure, the test specimen equipped with a strain measuring sensor; connecting the dummy structure to a magnet unit including a magnet holder and a hook extending from the magnet holder, creating an electromagnetic force in the magnet holder to fix the magnet unit to a plate, and setting the dummy structure and the test specimen at a predetermined drop height; cancelling the electromagnetic force in the magnet unit using a controller such that the hook rotates around a rotation shaft of the plate and the dummy structure and the test specimen falls down; and measuring impulse of the test specimen using the load cell unit and measuring a strain variation of the test specimen using the strain measuring sensor.

The drop testing method may further include calculating a center of gravity of the dummy structure onto which the test specimen is installed and calculating a moment of inertia using a period of oscillation of the dummy structure.

The load cell unit may include a first frame connected to the dummy structure, a second frame connected to the test specimen, a plurality of load cells provided between the first frame and the second frame, and a guiding unit provided between two adjacent load cells from among the plurality of load cells to guide movement of the second frame against the first frame.

According to one or more embodiments, a drop testing apparatus includes a plate, a magnet holder provided at one end of the plate and fixed to or disconnected from the plate by an electromagnetic force, a hook extending from one side of the magnet holder and inserted through an opening of the plate, a counterweight provided at another end of the plate and facing the magnet holder, and a rotation member provided at the opening of the plate to rotate the hook. When the electromagnetic force is created in the magnet holder, the magnet holder may be fixed to the plate. When the electromagnetic force is cancelled in the magnet holder, the magnet holder may be disconnected from the plate and the hook may rotate around the rotation member at the opening.

The drop testing apparatus may further include an elastic member provided between the hook and the plate.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
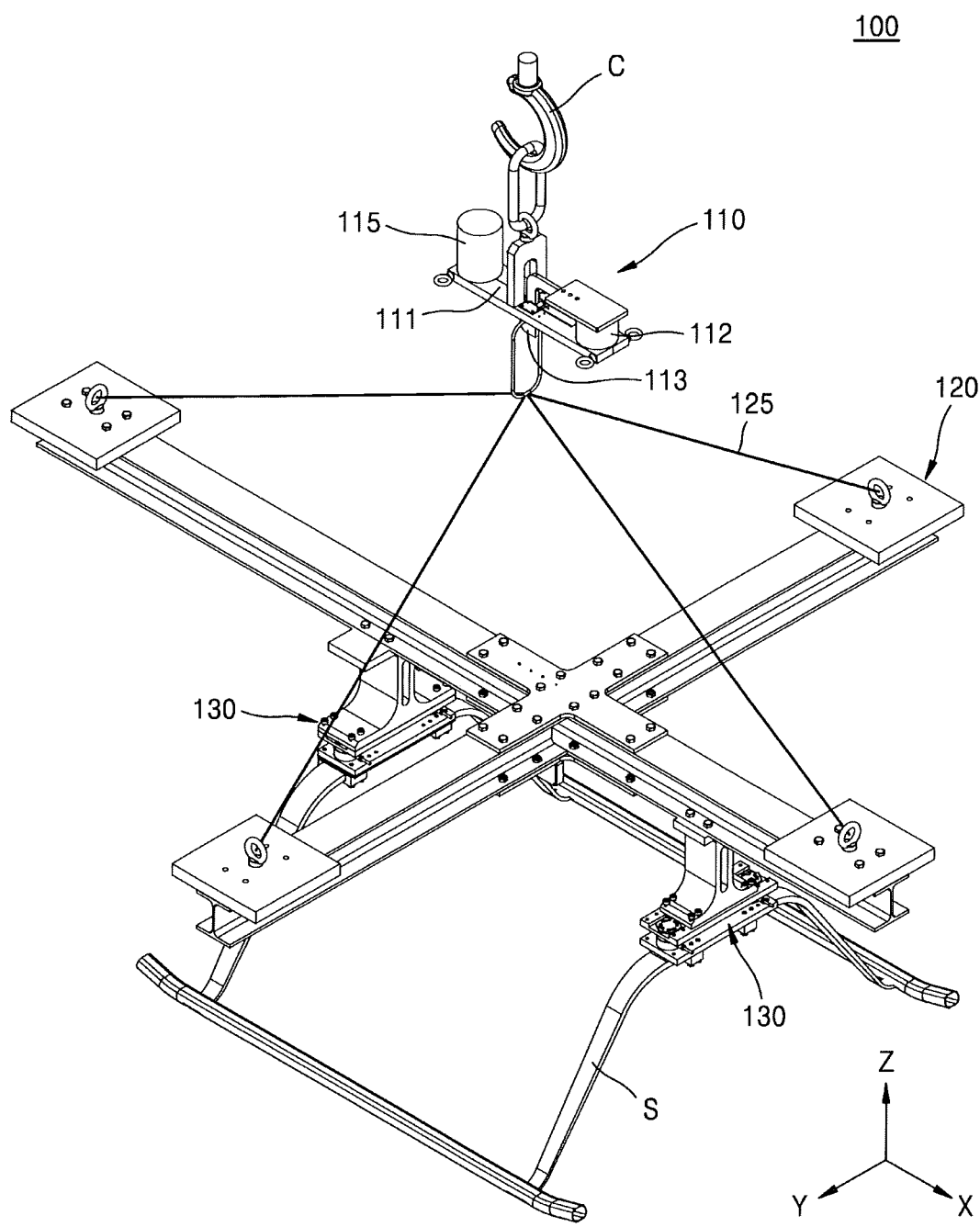
FIG. 1 is a perspective view of a drop testing apparatus according to one or more embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. The terms first, second, etc. are used in the description of the embodiments to only distinguish one element from another. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features or components, but do not preclude the presence or addition of one or more other features or components.

In the drawings, the size of elements may be exaggerated or reduced for clarity. For instance, the size and thickness of each element may be arbitrarily illustrated in the drawings, and therefore, the present invention is not limited to the drawings. In addition, when an embodiment can be modified, the order of processes may be different from the order in which the processes are described. For instance, two processes sequentially described may be substantially performed simultaneously or in reverse order.

The embodiments of the present invention will now be described more fully with reference to the accompanying drawings. Like reference numerals in the drawings denote like elements, and thus their description will be omitted.

Figure 2:
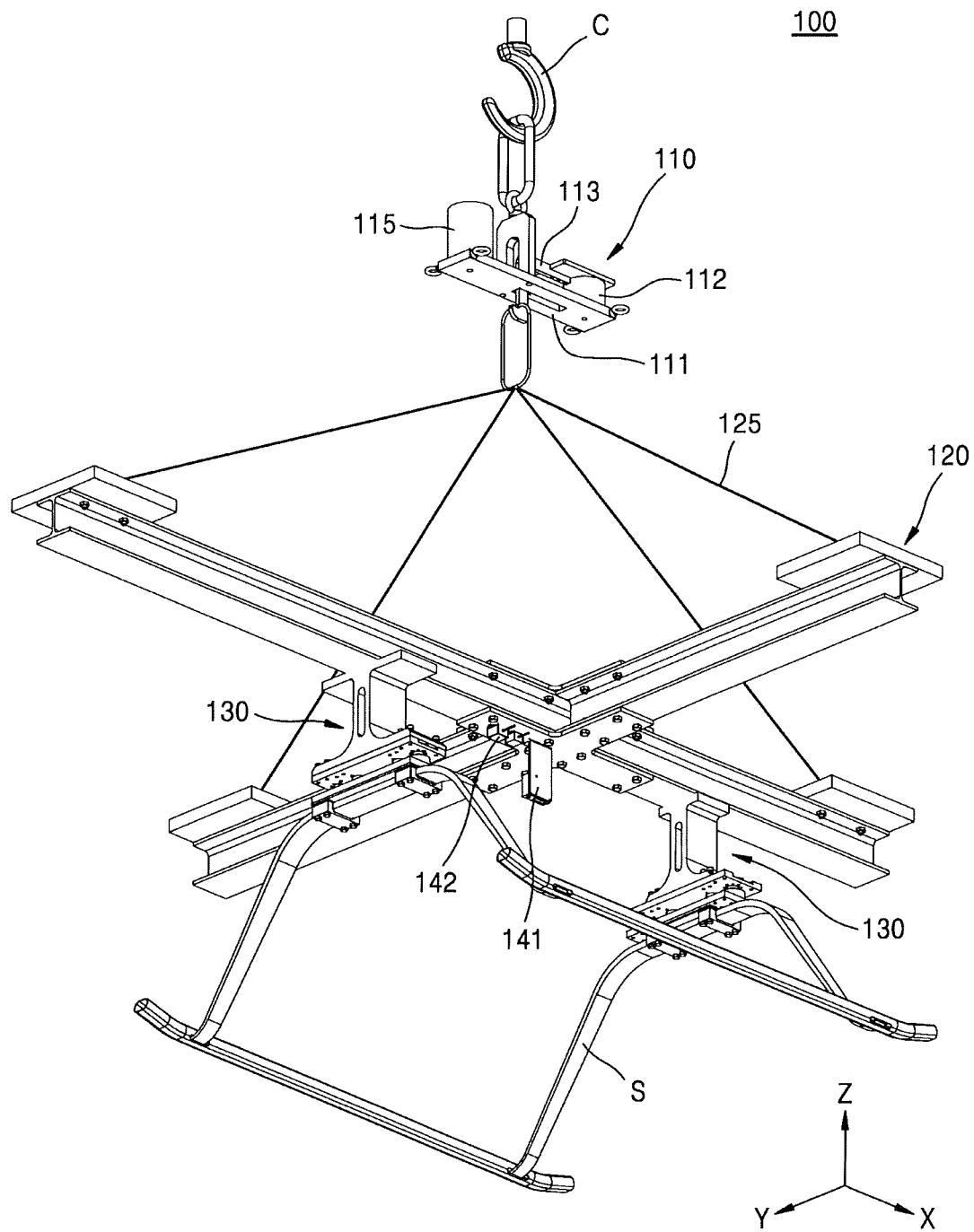
FIG. 2 is another perspective view of the drop testing apparatus shown in FIG. 1.
Figure 3:
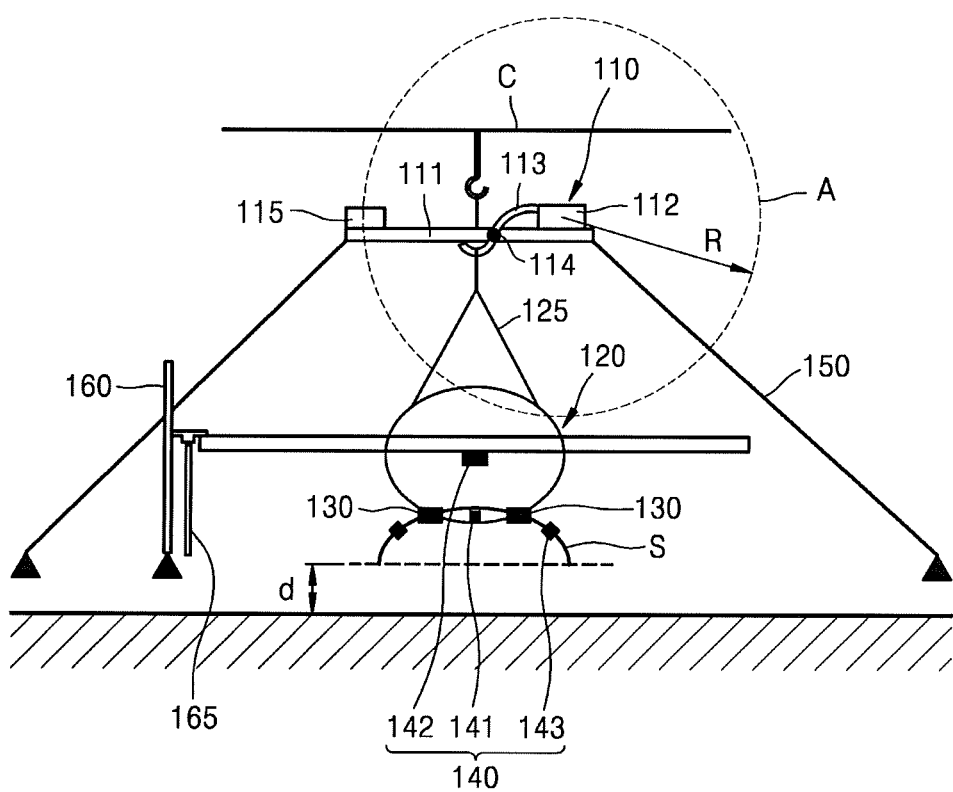
FIG. 3 is a conceptual diagram of the structure of the drop testing apparatus shown in FIG. 1.

FIG. 1 is a perspective view of a drop testing apparatus 100 according to one or more embodiments. FIG. 2 is another perspective view of the drop testing apparatus 100 shown in FIG. 1. FIG. 3 is a conceptual diagram of the structure of the drop testing apparatus 100 shown in FIG. 1.

Referring to FIGS. 1 through 3, the drop testing apparatus 100 may include a magnet unit 110, a dummy structure 120, a load cell unit 130, a sensor unit 140, a position setting unit 150, and a tilt setting unit 160. The drop testing apparatus 100 may be connected to an external crane C to perform drop testing of a test specimen S. When the drop testing apparatus 100 performs the drop testing, the test specimen S is installed onto the dummy structure 120, so that data about a fall of the test specimen S can be measured very closely according to its actual state.

The drop testing apparatus 100 may be applied to various weights and falling objects. The drop testing apparatus 100 may be applied to a range of objects from small components up to aircraft or components (mechanical, communication, or electronic) not exceeding 1 ton corresponding to five times the capacity of the magnet unit 110 or up to the capacity of the crane C.

The magnet unit 110 may be connected to the crane C and may be controlled by an electromagnetic force. The magnet unit 110 engages with the dummy structure 120 when the electromagnetic force is created and disengages from and drops the dummy structure 120 when the electromagnetic force is cancelled.

Figure 4:
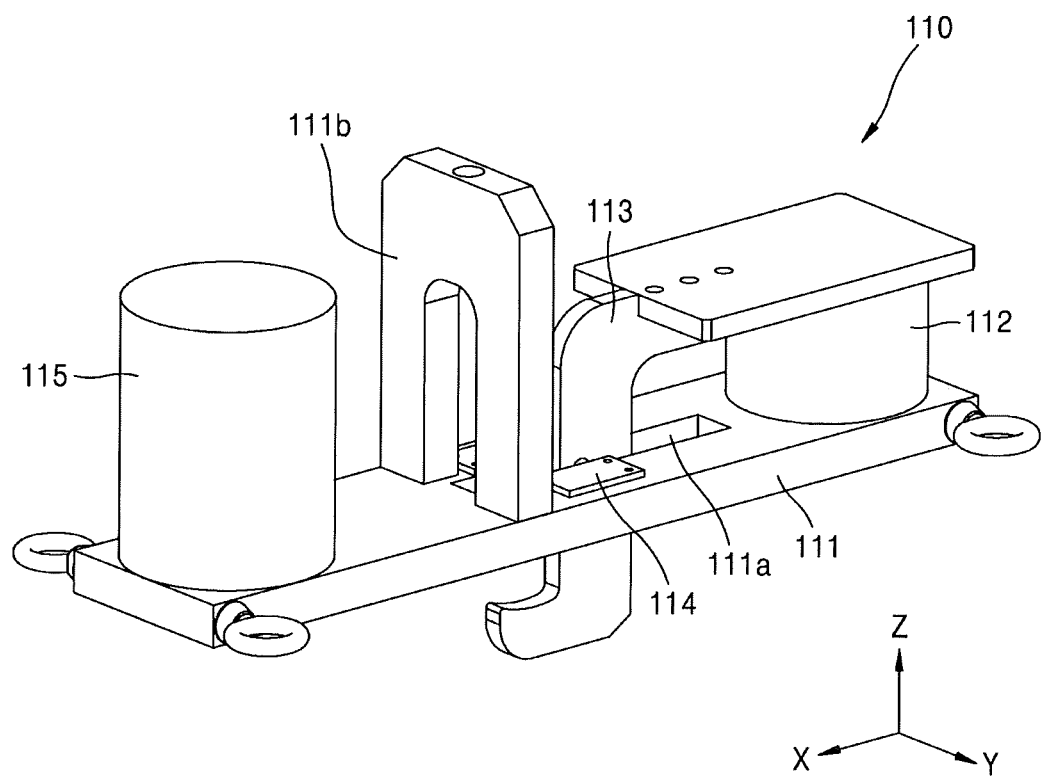
FIG. 4 is a perspective view of a magnet unit shown in FIG. 1.

FIG. 4 is a perspective view of the magnet unit 110 shown in FIG. 1.

Referring to FIG. 4, the magnet unit 110 may include a plate 111, a magnet holder 112, a hook 113, a rotation member 114, and a counterweight 115.

The plate 111 may be installed at one side of the crane C through a connecting member. The plate 111 may include an opening 111*a* into which the hook 113 is inserted and a connecting part 111*b* which extends in a height direction to be connected with the crane C. The magnet holder 112 and the counterweight 115 may be respectively disposed at two sides of the connecting part 111*b* on the plate 111.

When an electromagnetic force is created by applying electric power, the magnet holder 112 may be fixed to the plate 111. When the electromagnetic force is cancelled by cutting off electric power, the magnet holder 112 may be disconnected from the plate 111.

The hook 113 may extend from one side of the magnet holder 112. The hook 113 is inserted through the opening 111*a* so as to pass through the plate 111. In other words, the hook 113 may protrude from one side of the magnet holder 112 and may be inserted through the opening 111*a* of the plate 111 to continue from one side of the plate 111 to another side of the plate 111. The hook 113 may be connected to the dummy structure 120 through a connecting member 125.

The rotation member 114 may be installed at one side of the opening 111*a* of the plate 111. The hook 113 may rotate around the rotation member 114. When an electromagnetic force is created at the magnet holder 112, the position of the hook 113 is fixed. When the electromagnetic force is cancelled, the hook 113 rotates around the rotation member 114. In this case, the magnet holder 112 becomes disconnected from the plate 111 and the hook 113 rotates, such that the connecting member 125 is disengaged from the hook 113.

The position of the rotation member 114 may be adjusted in a length direction of the plate 111. The rotation member 114 may move along the side of the opening 111*a* between the connecting part 111*b* and the magnet holder 112. As the rotation member 114 moves, the magnitude of force sustainable by the magnet holder 112 may be adjusted.

The counterweight 115 may be disposed to face the magnet holder 112 and may have nearly the same weight as the magnet holder 112. The counterweight 115 has the same weight as the magnet holder 112, so that the plate 111 is in equilibrium.

Referring to back to FIGS. 1 through 3, the dummy structure 120 may be set according to an object onto which the test specimen S is installed. In other words, in order to obtain data such as impulse provided to an object when the object equipped with the test specimen S falls, the dummy structure 120 is set according to the object onto which the test specimen S is installed. Accordingly, the dummy structure 120 is not limited to a particular object or shape but may be selected according to an object onto which the test specimen S is installed.

The test specimen S is not limited to a particular object or shape and may be selected according to an object to be tested. However, for convenience's sake, it is assumed hereinafter that the dummy structure 120 is a fuselage of an aircraft and the test specimen S is a landing member installed onto the fuselage.

The test specimen S may be installed at one side of the dummy structure 120 and may directly contact the ground during a drop test. Since the dummy structure 120 is an object onto which the test specimen S is actually installed, the measurement accuracy and reliability of the drop testing apparatus 100 may be increased.

The load cell unit 130 is provided between the dummy structure 120 and the test specimen S. The load cell unit 130 may measure impulse of the test specimen S. Although not shown, the load cell unit 130 may be provided at a point where the test specimen S contacts the ground to measure impulse of the test specimen S from the ground. For convenience's sake, it is assumed hereinafter that the load cell unit 130 is provided between the dummy structure 120 and the test specimen S.

Figure 5A:
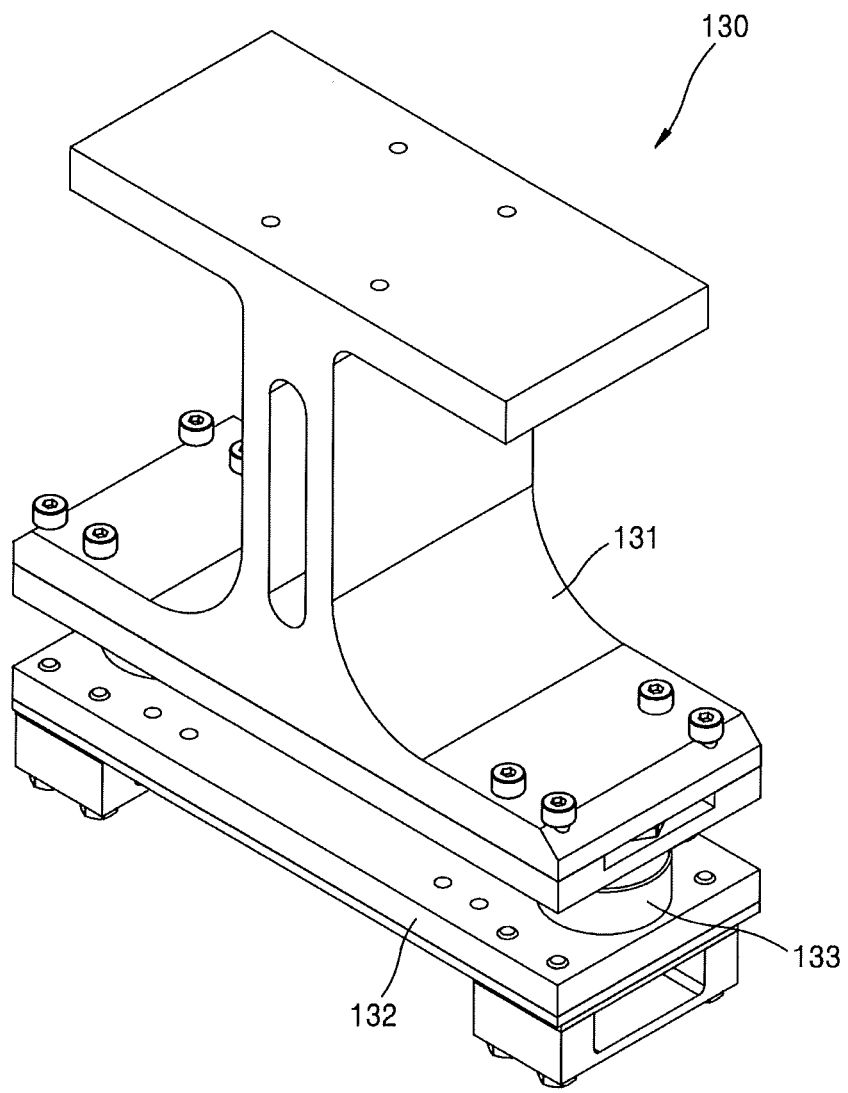
FIG. 5A is a perspective view of a load cell unit shown in FIG. 1.
Figure 5B:
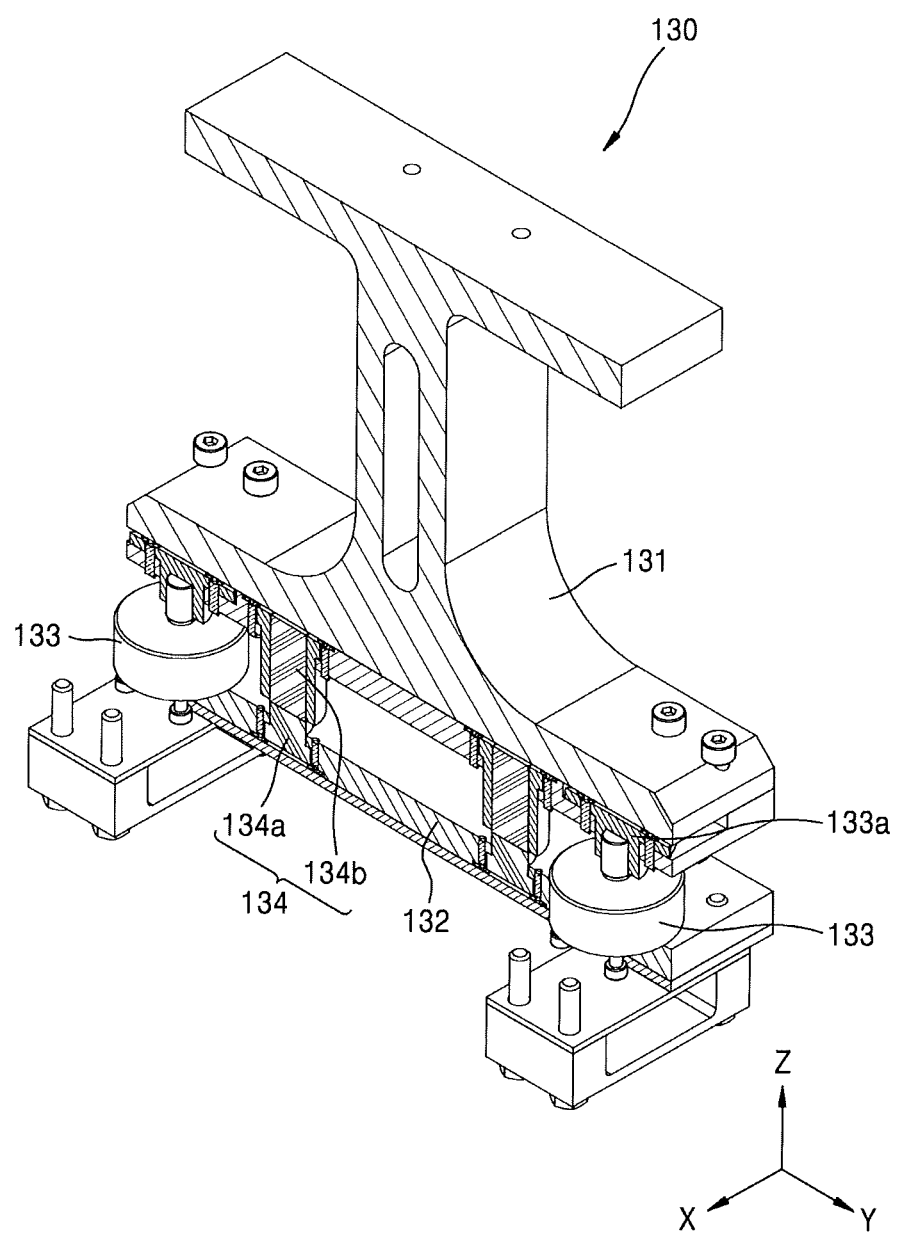
FIG. 5B is a perspective view of the load cell unit shown in FIG. 5A, part of which has been cut away.

FIG. 5A is a perspective view of the load cell unit 130 shown in FIG. 1. FIG. 5B is a perspective view of the load cell unit 130 shown in FIG. 5A part of which has been cut away.

Referring to FIGS. 5A and 5B, the load cell unit 130 may include a first frame 131 connected with the dummy structure 120 and a second frame 132 connected with the test specimen S. A plurality of load cells 133 may be provided between the first frame 131 and the second frame 132. The load cells 133 may measure impulse between the first frame 131 and the second frame 132. When the test specimen S is dropped, an impact is transmitted from the second frame 132 to the first frame 131, and therefore, the load cells 133 may measure impulse applied to the test specimen S when the test specimen S falls to the ground.

Both ends of each load cell 133 may be respectively inserted into the first frame 131 and the second frame 132. Each end of the load cell 133 may be inserted into an insertion groove of a packing member 133*a*, so that the position of the load cell 133 is fixed.

A guiding unit 134 may be provided between two adjacent load cells 133 to guide the movement of the second frame 132 against the first frame 131. One end of the guiding unit 134 may be fixed to one of the first and second frames 131 and 132 and the other end of the guiding unit 134 may be coupled with the other of the first and second frames 131 and 132 to be movable linearly.

The guiding unit 134 may include an insertion protrusion 134*a* protruding from the first frame 131 or the second frame 132 and an insertion part 134*b* into which the insertion protrusion 134*a* is inserted. The insertion protrusion 134*a* is inserted into the insertion part 134*b* and may thus guide the movement of the first or second frame 131 or 132 in a falling direction.

Since the guiding unit 134 guides the movement of the first or second frame 131 or 132 in the falling direction, the accuracy of the measurement of impulse by the load cells 133 may be increased. In other words, since the guiding unit 134 guides the direction of force produced during falling, the load cells 133 may easily measure falling direction impulse.

Referring back to FIGS. 1 through 3, the drop testing apparatus 100 may include the sensor group 140, which may include a distance measuring sensor 141 measuring a distance between the dummy structure 120 or the test specimen S and the ground, a strain measuring sensor 143 measuring a strain variation in the test specimen S, and a position measuring sensor 142 measuring a position variation, e.g., a displacement, a velocity, an angular velocity, acceleration or angular acceleration of the test specimen S. The sensor group 140 may be connected with a controller 170 and the controller 170 may perform an operation on measured data or may output the measured data.

The distance measuring sensor 141 may measure a falling distance "d" between the ground and the test specimen S to set a drop position of the test specimen S. The distance measuring sensor 141 may be provided at the test specimen S or the dummy structure 120 to face the ground and may be, for example, a laser sensor or an infrared sensor.

The strain measuring sensor 143 may be provided at one side of the test specimen S and may measure a strain variation in the test specimen S during falling.

The position measuring sensor 142 may be provided close to the center of mass of the dummy structure 120 to measure a position variation, e.g., a displacement, a velocity, an angular velocity, acceleration or angular acceleration of the test specimen S or the dummy structure 120.

The sensor group 140 is provided separated from the magnet unit 110 not to be influenced by an electromagnetic force formed at the magnet unit 110. The dummy structure 120 is extended in the falling direction by the connecting member 125. The magnet holder 112 is provided in the magnet unit 110 to be adjacent to the crane C and the sensor group 140 is provided at the dummy structure 120 or the test specimen S. Accordingly, the sensor group 140 may be separated from the magnet unit 110 by a predetermined distance.

A region denoted by a reference character A in FIG. 3 represents an electromagnetic field produced in the magnet unit 110. The electromagnetic field has a radius R. In other words, an electromagnetic force is strong in the radius R of the magnet unit 110 but is weak beyond the radius R. The distance between the magnet holder 112 and the sensor group 140 is set to be greater than the radius R in the drop testing apparatus 100, and therefore, the sensor group 140 is not influenced by the electromagnetic force. As a result, durability, stability, and reliability can be increased.

The position setting unit 150 may extend obliquely from a side edge of the plate 111 toward the ground to fix the plate 111 to a predetermined position. After the position setting unit 150 fixes the position of the plate 111, the period of oscillation may be measured to measure the moment of inertia of the dummy structure 120 and the test specimen S. The controller 170 may calculate the center of gravity of the dummy structure 120 equipped with the test specimen S and may calculate the moment of inertia using the period of oscillation of the dummy structure 120 of which the position has been fixed by the position setting unit 150.

A tilt setting unit 160 may be provided at an end of the dummy structure 120 to set a tilt of the dummy structure 120 with respect to the ground. The tilt setting unit 160 may allow the dummy structure 120 to have a tilt angle, thereby setting various conditions of a testing environment.

A height adjusting member 165 may be provided adjacent to the tilt setting unit 160 to adjust the height of the dummy structure 120. The height adjusting member 165 has gradations, so that the set height of the dummy structure 120 can be checked.

Figure 6:
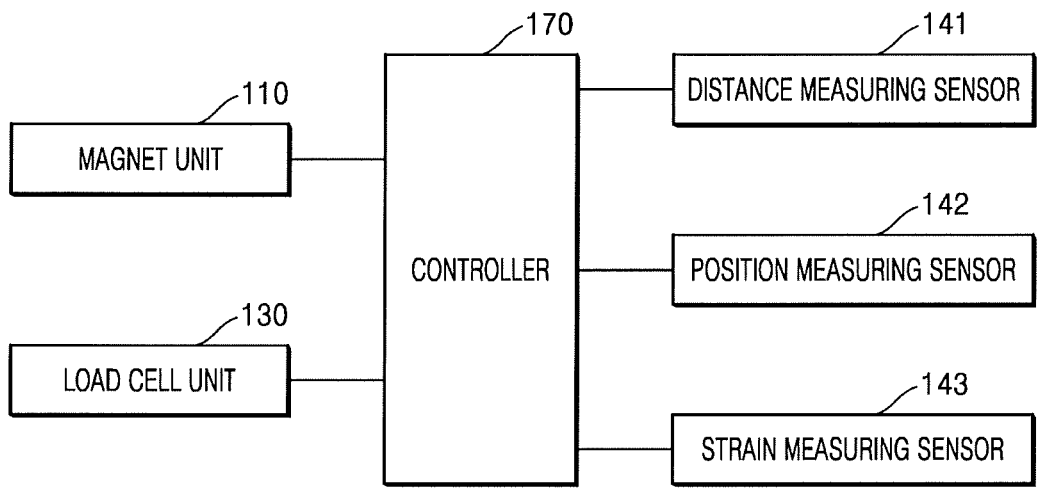
FIG. 6 is a block diagram of a control relationship in the drop testing apparatus shown in FIG. 1.

FIG. 6 is a block diagram of a control relationship in the drop testing apparatus 100 shown in FIG. 1.

Referring to FIG. 6, the drop testing apparatus 100 may collect data from the sensor group 140 and perform an operation on the data using the controller 170. The controller 170 may be connected with the magnet unit 110, the load cell unit 130, the distance measuring sensor 141, the position measuring sensor 142, and the strain measuring sensor 143.

The controller 170 may generate a signal for dropping the test specimen S and may measure a mass moment of inertia using a load, displacement, acceleration, and a strain variation, which have been measured by the sensor group 140.

The controller 170 may be connected with the magnet unit 110 and may create or cancel an electromagnetic force. When the controller 170 applies a signal for creating an electromagnetic force to the magnet unit 110, the magnet holder 112 may be fixed to the plate 111 by the electromagnetic force that has been created. Accordingly, the dummy structure 120 and the test specimen S may be connected with the magnet unit 110.

When the controller 170 applies a signal for cancelling the electromagnetic force to the magnet unit 110, the magnet holder 112 may rotate around the rotation member 114 and thus be disconnected from the plate 111. Thereafter, the dummy structure 120 and the test specimen S disengage from the magnet unit 110 and falls to the ground.

The load cell unit 130 may calculate impulse on the test specimen S falling to the ground and may transmit the calculated impulse to the controller 170. The distance measuring sensor 141 may transmit data about the height of the test specimen S to the controller 170. Since the distance measuring sensor 141 may transmit the data with respect to a different tilt of the test specimen S, a position relation of the test specimen S under various position conditions may be calculated.

The position measuring sensor 142 may measure data about a position variation in the test specimen S during falling and transmit the data to the controller 170. The strain measuring sensor 143 may measure a strain of the test specimen S, which has been changed due to an impact, and may transmit the measured strain to the controller 170.

Figure 7:
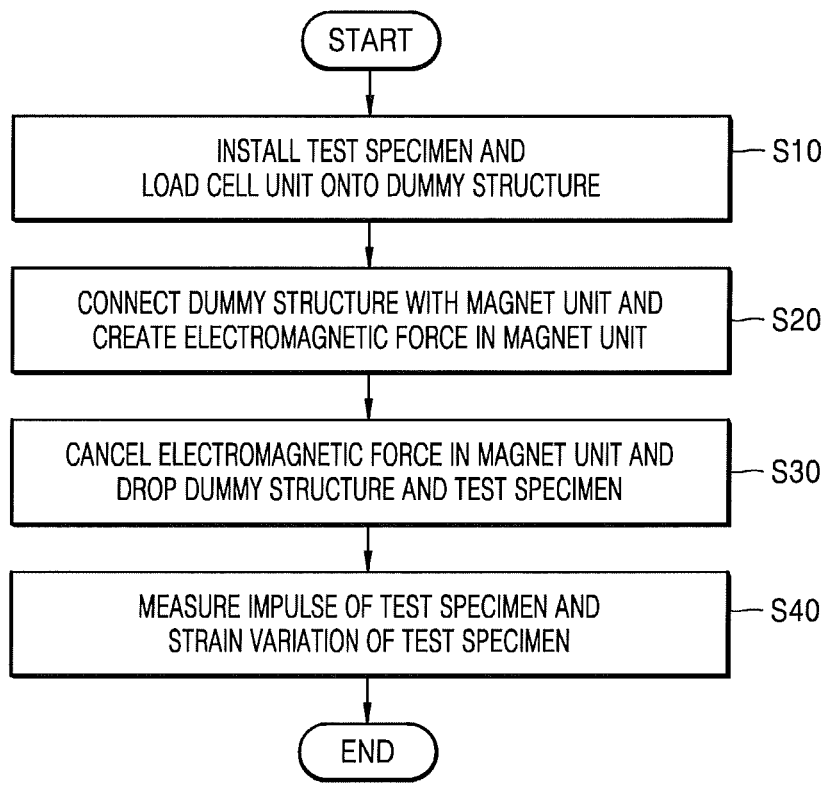
FIG. 7 is a flowchart of a drop testing method according to one or more embodiments.

FIG. 7 is a flowchart of a drop testing method according to one or more embodiments.

Referring to FIG. 7, the drop testing method using the drop testing apparatus 100 may include installing the test specimen S and the load cell unit 130 onto the dummy structure 120 in operation S10, connecting the dummy structure 120 with the magnet unit 110 in operation S20, dropping the dummy structure 120 and the test specimen S in operation S30, and measuring impulse of the test specimen S and a strain variation of the test specimen S in operation S40.

When the test specimen S and the load cell unit 130 are installed onto the dummy structure 120 in operation S10, the load cell unit 130 may be provided between the test specimen S equipped with the strain measuring sensor 143 and the dummy structure 120. The load cell unit 130 may also be provided at one side of the test specimen S which contacts the ground.

When the dummy structure 120 is connected to the magnet unit 110 in operation S20, an electromagnetic force may be created in the magnet unit 110 and the dummy structure 120 and the test specimen S may be set at a predetermined drop height. The magnet unit 110 may be made in a portable size, and therefore, the magnet unit 110 may be carried to a place where there are the dummy structure 120 and the test specimen S and then connected to the crane C. When the controller 170 applies a signal for creating an electromagnetic force to the magnet unit 110, the dummy structure 120 and the test specimen S are connected with the magnet unit 110. The height of the dummy structure 120 may be set using the distance measuring sensor 141 or the height adjusting member 165.

When the dummy structure 120 and the test specimen S are dropped in operation S30, the controller 170 may cancel the electromagnetic force created in the magnet unit 110, so that the dummy structure 120 and the test specimen S may be dropped onto the ground.

When the impulse on the test specimen S and the strain variation in the test specimen S are measured in operation S40, the impulse on the test specimen S may be measured using the load cell unit 130 and the strain variation may be measured using the strain measuring sensor 143.

Figure 8A:
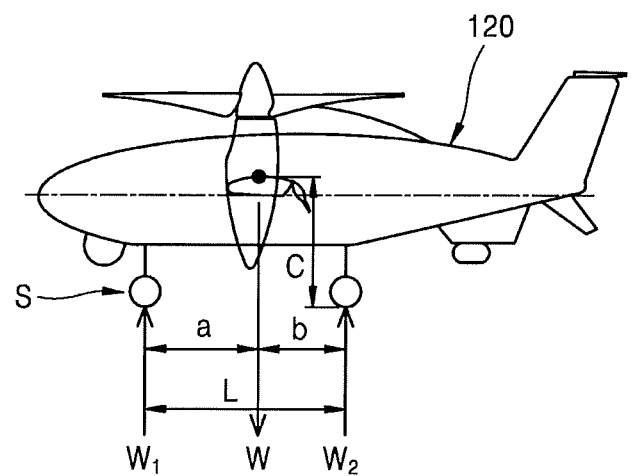
FIGS. 8A through 8C are diagrams of a drop testing method according to one or more embodiments.
Figure 8B:
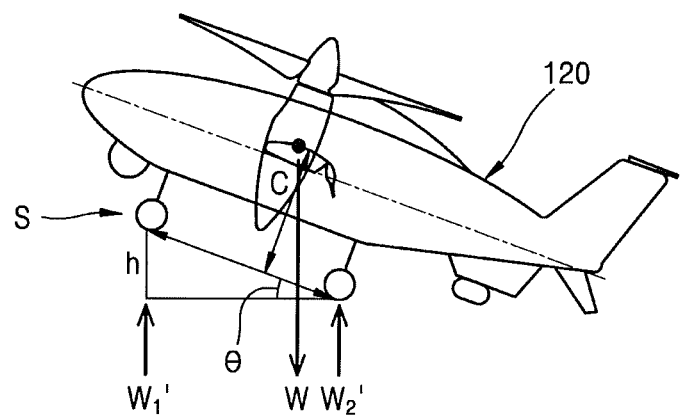
Figure 8C:
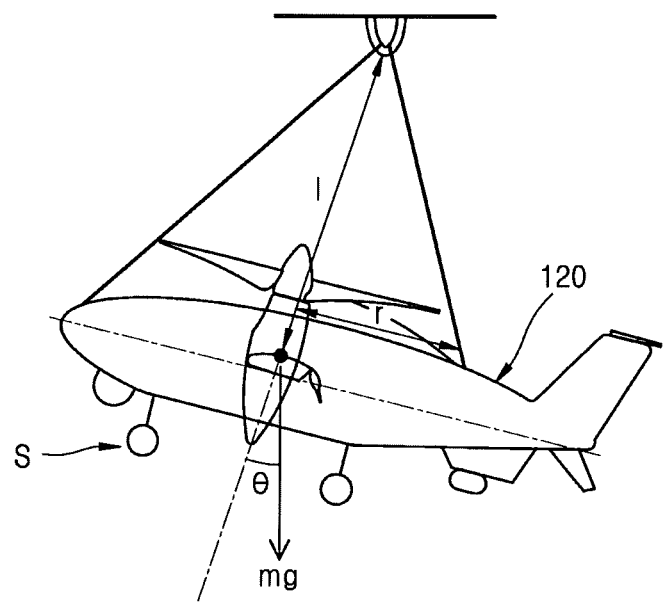

FIGS. 8A through 8C are diagrams of a drop testing method according to one or more embodiments.

Referring to FIGS. 8A through 8C, the drop testing method may include calculating a mass moment of inertia using data collected from a sensor.

FIG. 8A shows a method of calculating a horizontal center of gravity. FIG. 8B shows a method of calculating a vertical center of gravity.

The horizontal center of gravity shown in FIG. 8A may be calculated using Equation 1:

$$a = \frac{W_2}{W} L, \qquad (1)$$

wherein "a" is a distance between the front end of the test specimen S and the center of gravity, $W_2$ is a weight measured at the rear end of the test specimen S, W is a weight measured at the front end of the test specimen S, and L is a distance between the front end and the rear end of the test specimen S.

The vertical center of gravity shown in FIG. 8B may be calculated using Equation 2:

$$c = \left(\frac{W_2'}{W}L - a\right)\cot\theta, \qquad (2)$$

wherein "a" is a distance between the front end of the test specimen S and the center of gravity, $W_2'$ is a weight measured at the rear end of the test specimen S, θ is a tilt angle of the test specimen S, and L is a distance between the front end and the rear end of the test specimen S.

To obtain the vertical center of gravity of the test specimen S, the test specimen S may be tilted and a tilt angle may be measured using the position measuring sensor 142. After a load measuring jig (not shown) is placed at the bottom surface of the test specimen S and another load measuring jig (not shown) is placed at the sloping surface of the test specimen S, a load may be measured. Thereafter, the vertical center of gravity may be obtained from a force and moment equilibrium equation.

FIG. 8C schematically shows a method of measuring the mass moment of inertia of the test specimen S. The position setting unit 150 may fix the magnet unit 110 so that the magnet unit 110 does not move. The controller 170 may measure the mass moment of inertia from an equation involving a period t of displacement measured from the pendulum movement of the test specimen S and the dummy structure 120 and a distance between centers of gravity of the dummy structure 120, as shown in Equation 3:

$$I_{xx} = I_{yy} = ml^2\left[\left(\frac{\tau}{2\pi}\right)^2\left(\frac{g}{l}\right) - 1\right] \qquad (3)$$

$$I_{zz} = wg\left(\frac{\tau}{2\pi}\right)^2\left(\frac{\gamma^2}{l}\right).$$

According to one or more embodiments, a drop testing apparatus and method use a portable magnet unit, so that drop tests can be performed under various conditions of a test environment.

In addition, sensors are not influenced by an electromagnetic force, so that reliability of measurement results is increased and durability and stability of a device is also increased.

Furthermore, a test specimen for which measured data is required and a dummy structure in which the test specimen is installed are separately provided and connected with each other, so that reliability of measurement results is increased.

Moreover, after a pressure is measured, the drop testing apparatus and method can be diversely used for vibration tests, structure tests, pressure measurement tests, etc.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A drop testing apparatus comprising:
   a plate connected to an external crane;
   a magnet holder provided at one end of the plate and fixed to the plate by an electromagnetic force;
   a hook extending from one side of the magnet holder and inserted through an opening of the plate;
   a counterweight provided at another end of the plate and facing the magnet holder;
   a dummy structure connected to the magnet holder through a connecting member connected to the hook, the dummy structure having a test specimen installed at one side thereof;
   a load cell unit provided between the dummy structure and the test specimen to measure impulse of the test specimen; and
   a controller configured to control the electromagnetic force to be created in the magnet holder and to receive the impulse measured by the load cell unit,
   wherein when the electromagnetic force is cancelled in the magnet holder, the magnet holder and the hook rotate around a rotation member of the plate such that the connecting member disengages from the hook and such that the dummy structure and the test specimen fall onto the ground.

2. The drop testing apparatus of claim 1, wherein the connecting member extends in a falling direction to allow the test specimen to be separated from the magnet holder by a predetermined distance.

3. The drop testing apparatus of claim 1, wherein the load cell unit comprises:
   a first frame connected to the dummy structure;
   a second frame connected to the test specimen;
   a plurality of load cells provided between the first frame and the second frame; and
   a guiding unit provided between two adjacent load cells from among the plurality of load cells to guide movement of the second frame against the first frame.

4. The drop testing apparatus of claim 1, further comprising a tilt setting unit provided at an end of the dummy structure to set a tilt of the dummy structure with respect to the ground.

5. The drop testing apparatus of claim 1, further comprising:

a distance measuring sensor provided at the one side of the dummy structure and facing the ground, wherein the distance measuring sensor measures a distance between the test specimen and the ground; and a strain measuring sensor provided at one side of the test specimen to measure a strain variation in the test specimen.

6. The drop testing apparatus of claim 5, further comprising a position measuring sensor provided close to a center of mass of the dummy structure to measure a position variation in the test specimen.

7. The drop testing apparatus of claim 1, further comprising a position setting unit extending obliquely from a side edge of the plate toward the ground to fix the plate to a predetermined position.

8. The drop testing apparatus of claim 7, wherein the controller calculates a center of gravity of the dummy structure onto which the test specimen is installed and calculates a moment of inertia using a period of oscillation of the dummy structure.

9. A drop testing apparatus comprising:
a magnet unit installed at one side of an external crane, the magnet unit comprising a magnet holder and a hook, wherein the magnet holder is configured to be fixed to a plate when an electromagnetic force is created and to rotate with respect to the plate when the electromagnetic force is cancelled, and the hook is configured to be inserted through an opening of the plate;
a dummy structure having one side connected to the hook and another side at which a test specimen facing the ground is installed; and
a load cell unit provided between the dummy structure and the test specimen, the load cell unit comprising a load cell and a guiding unit provided adjacent to the load cell and extending in a falling direction of the test specimen, wherein when the electromagnetic force is created in the magnet unit, the dummy structure is connected to the magnet unit, and when the electromagnetic force is cancelled, the magnet holder and the hook rotate around a rotation member of the plate and the dummy structure disengages from the hook and falls onto the ground.

10. The drop testing apparatus of claim 9, further comprising:
a first sensor provided at the one side of the dummy structure to measure a position variation of the dummy structure or a distance between the dummy structure and the ground; and
a second sensor provided at one side of the test specimen to measure a strain variation in the test specimen.

11. A drop testing apparatus comprising:
a plate;
a magnet holder provided at one end of the plate and configured to be fixed to or disconnected from the plate by an electromagnetic force;
a hook extending from one side of the magnet holder and inserted through an opening of the plate;
a counterweight provided at another end of the plate and facing the magnet holder; and
a rotation member provided at the opening of the plate to rotate the hook,
wherein when the electromagnetic force is created in the magnet holder, the magnet holder is fixed to the plate, and when the electromagnetic force is cancelled in the magnet holder, the magnet holder is disconnected from the plate and the hook rotates around the rotation member at the opening.

* * * * *